(12) United States Patent
Sakakibara

(10) Patent No.: US 7,817,322 B2
(45) Date of Patent: Oct. 19, 2010

(54) OPTICAL SCANNING DEVICE, IMAGE DISPLAY DEVICE PROVIDED WITH OPTICAL SCANNING DEVICE, RETINAL SCANNING DISPLAY, AND DRIVING METHOD OF OPTICAL SCANNING ELEMENT

(75) Inventor: Masahiro Sakakibara, Hoi-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 69 days.

(21) Appl. No.: 12/382,610

(22) Filed: Mar. 19, 2009

(65) Prior Publication Data
US 2009/0185133 A1    Jul. 23, 2009

Related U.S. Application Data

(63) Continuation-in-part of application No. PCT/JP2007/068374, filed on Sep. 21, 2007.

(30) Foreign Application Priority Data

Sep. 29, 2006   (JP)   ............................ 2006-270130

(51) Int. Cl.
G02B 26/10   (2006.01)
(52) U.S. Cl. .................. 359/213.1; 359/247; 359/223.1
(58) Field of Classification Search .............. 359/247, 359/213.1, 223.1
See application file for complete search history.

(56) References Cited

U.S. PATENT DOCUMENTS

| | | | |
|---|---|---|---|
| 6,297,898 B1* | 10/2001 | Tanijiri et al. ............ | 359/224.1 |
| 2004/0240018 A1* | 12/2004 | Cannon et al. ............. | 359/199 |
| 2005/0185237 A1* | 8/2005 | Nakajima ................... | 359/212 |
| 2007/0070481 A1 | 3/2007 | Nishikawa et al. | |
| 2008/0013143 A1* | 1/2008 | Ide et al. .................... | 359/223 |
| 2008/0144154 A1* | 6/2008 | Asai .......................... | 359/224 |
| 2009/0284190 A1* | 11/2009 | Matsubara et al. ........ | 318/114 |

FOREIGN PATENT DOCUMENTS

| | | |
|---|---|---|
| JP | A-2005-181477 | 7/2005 |
| JP | A-2005-208251 | 8/2005 |
| JP | A-2005-257811 | 9/2005 |
| JP | A-2005-275198 | 10/2005 |
| WO | WO 2005/059624 A1 | 6/2005 |

* cited by examiner

Primary Examiner—Jessica T Stultz
(74) Attorney, Agent, or Firm—Oliff & Berridge, PLC

(57) ABSTRACT

An optical scanning element performs scanning with light by bringing a mirror portion into a swinging state by generating resonance oscillations of the mirror portion due to torsional oscillations. The optical scanning element has a first resonance frequency and a second resonance frequency which generate longitudinal oscillations and lateral oscillations on a lower region side and a high region side of a resonance frequency of the torsional oscillations respectively. Outputting of a drive signal is started by setting a frequency of a drive signal which is used for oscillating the optical scanning element to a specific frequency which falls between the first resonance frequency and the second resonance frequency and is higher than the resonance frequency of the torsional oscillations and, thereafter, the frequency of the outputted drive signal is shifted to the resonance frequency of the torsional oscillations after outputting of the drive signal is started.

9 Claims, 10 Drawing Sheets

Fig. 13

| FIRST DRIVE TIME ELAPSED TIME | LESS THAN Ta(ma) | EQUAL TO OR MORE THAN Ta(ms) |
|---|---|---|
| DRIVE VOLTAGE | FIRST DRIVE VOLTAGE | SECOND DRIVE VOLTAGE |

OPTICAL SCANNING DEVICE, IMAGE DISPLAY DEVICE PROVIDED WITH OPTICAL SCANNING DEVICE, RETINAL SCANNING DISPLAY, AND DRIVING METHOD OF OPTICAL SCANNING ELEMENT

CROSS-REFERENCE TO RELATED APPLICATIONS

The present application is a Continuation-in-Part of International Application PCT/JP2007/068374 filed on Sep. 21, 2007, which claims the benefits of Japanese Patent Application No. 2006-270130 filed Sep. 29, 2006.

BACKGROUND

1. Field

The present invention relates to a technique for an optical scanning device, an image display device provided with an optical scanning device, a retinal scanning display, and a driving method of an optical scanning element, and more particularly to a driving technique for an optical scanning element.

2. Description of the Related Art

Conventionally, with respect to an optical scanning device which scans light, there has been known an optical scanning device which scans light using a resonance-type optical scanning element. With respect to the resonance-type optical scanning element, as described in JP-A-2005-275198, there has been known an optical scanning element which includes a mirror portion having a reflection surface, and an oscillating body which is connected to the mirror portion and includes a spring portion which generates torsional oscillations thus capable of performing resonance oscillations of the mirror portion in a swinging state. Here, light which is incident on the optical scanning element due to the resonance oscillations of the mirror portion is scanned on the reflection surface.

In this kind of optical scanning device, optical scanning is performed by making use of the resonance oscillations generated at the time of torsional oscillations of the oscillating body. However, the oscillating body is considered to generate subsidiary resonance oscillations besides the torsional oscillations. As such subsidiary resonance oscillations, a phenomenon in which the mirror portion of the oscillating body oscillates in a direction parallel to the reflection surface, that is, the lateral oscillations, a phenomenon in which the mirror portion of the oscillating body oscillates in a direction perpendicular to the reflection surface, that is, longitudinal oscillations and the like are named.

However, when the resonance frequency of the torsional oscillations and the resonance frequency of the subsidiary oscillations agree with each other or are arranged close to each other, even when the oscillating body is oscillated with frequency equal to the resonance frequency of the torsional oscillations, the subsidiary oscillations are superposed on the torsional oscillations in the oscillating body. When the superposition of the subsidiary oscillations on the torsional oscillations occurs along with the oscillations of the oscillating body, an oscillation state of the reflection surface of the mirror portion is deviated from a target oscillation state and hence, the characteristics of optical scanning are also deviated from target characteristics. Accordingly, the optical scanning element is designed such that the resonance frequency of torsional oscillations and the resonance frequency of subsidiary oscillations do not come close to each other.

SUMMARY

However, in allowing the optical scanning device to generate torsional oscillations by driving the spring portion of the optical scanning element, even when a drive signal having a frequency equal to the resonance frequency of torsional oscillations is applied to the optical scanning element, the oscillation frequency of the oscillating body does not promptly become equal to the resonance frequency of torsional oscillations, and the oscillation frequency of the oscillating body is gradually increased.

Accordingly, when the resonance frequency of the subsidiary resonance oscillations is lower than the resonance frequency of the torsional oscillations, before the oscillation frequency of the oscillating body reaches the resonance frequency of torsional oscillations, the oscillation frequency of the oscillating body passes the resonance frequency of the subsidiary resonance oscillations passes and hence, the subsidiary resonance oscillations are inevitably generated.

When the subsidiary resonance oscillations continue and a considerable time is spent before the oscillation frequency of the oscillating body passes the resonance frequency of the subsidiary resonance oscillations, the spring portion may be damaged by the energy generated when the oscillation frequency of the oscillation frequency of the oscillating body passes the resonance frequency of the subsidiary resonance oscillations.

According to one aspect of the present invention, there is provided an optical scanning device which includes: an optical scanning element which includes a mirror portion having a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being also configured to generate subsidiary resonance oscillations consisting of longitudinal oscillations or lateral oscillations at a first resonance frequency on a lower region side and at a second resonance frequency on a higher region side with respect to a resonance frequency of the resonance oscillations in the swinging state due to the torsional oscillations; and a drive signal outputting part which is configured to output a drive signal for oscillating the spring portion at a specific frequency which is a frequency between the first resonance frequency and the second resonance frequency and is higher than the resonance frequency of the torsional oscillations and, thereafter, to shift the frequency of the drive signal to the resonance frequency of the torsional oscillations.

According to another aspect of the present invention, there is provided an image display device which includes the above-mentioned optical scanning device and is configured to display an image by scanning an optical flux modulated in response to an image signal on an image in two-dimensional directions by the optical scanning device.

According to still another aspect of the present invention, there is provided a retinal scanning display which includes the above-mentioned optical scanning device and is configured to display an image by scanning an optical flux modulated in response to an image signal on an image in a primary direction and a secondary direction by the optical scanning device thus projecting the image on a retina of eye.

According to a further aspect of the present invention, there is provided a driving method of an optical scanning element, the optical scanning element including a mirror portion which has a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being configured to generate subsidiary resonance oscillations consisting of longitudinal oscillations or lateral oscillations at a first resonance frequency on a lower region side and at a second resonance frequency on a higher region side with respect to a resonance frequency of the resonance oscillations in the swinging state due to the torsional oscillations, wherein the driving method includes the steps of: starting outputting of the drive signal by setting the frequency of a drive signal to a specific frequency which is a frequency between the first resonance frequency and the second resonance frequency and is higher than the resonance frequency of the torsional oscillations; and shifting the frequency of the outputted drive signal to the resonance frequency of the torsional oscillations after outputting of the drive signal starts.

BRIEF DESCRIPTION OF THE DRAWINGS

FIG. 13 is a view for explaining a driving method of the optical scanning element of the embodiment according to the present invention.

DETAILED DESCRIPTION

First Embodiment

1. Explanation of the Whole Image Display Device 1

Figure 1:
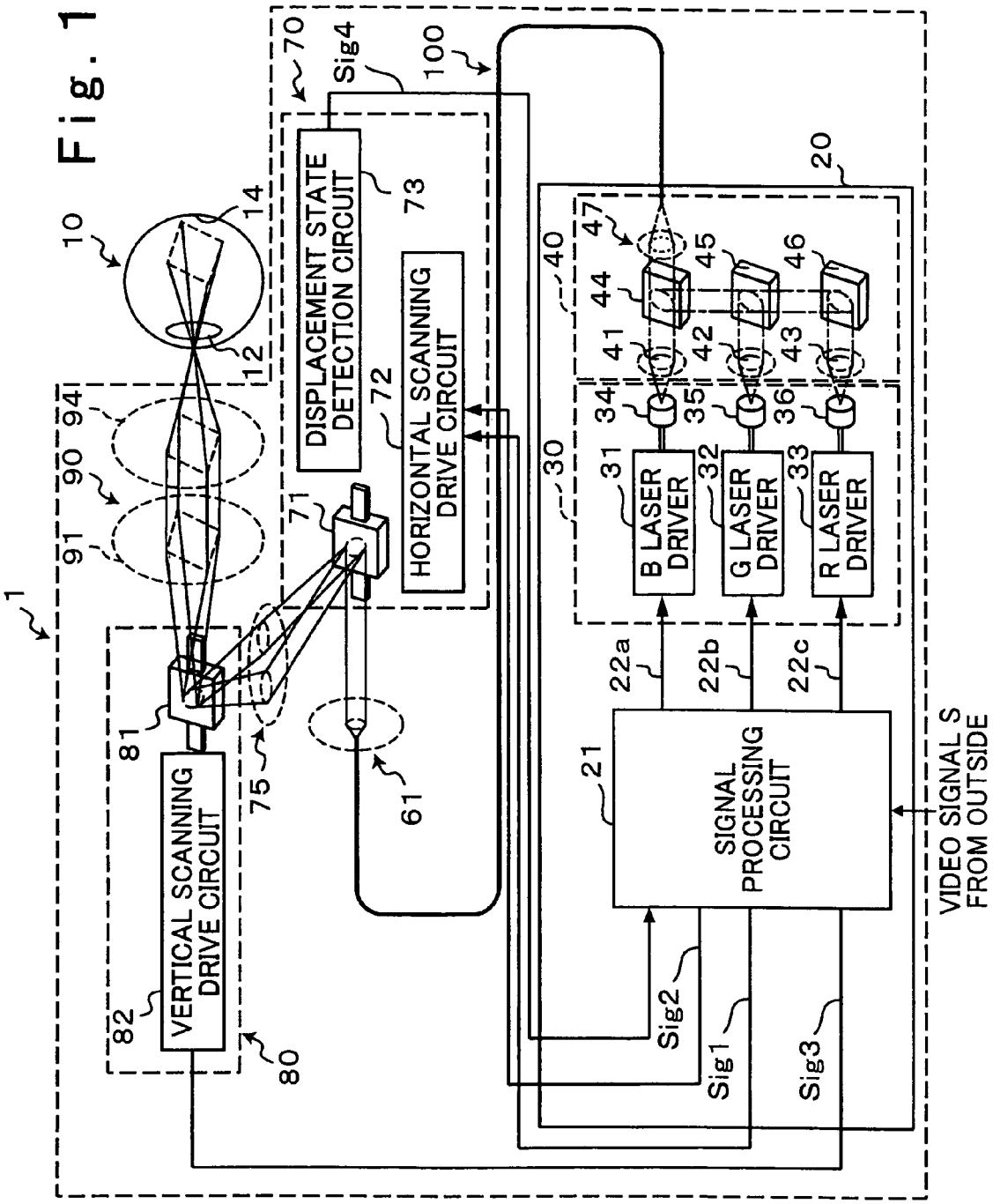
FIG. 1 is a view showing the whole constitution of an image display device of an embodiment according to the present invention.

First of all, the whole constitution of an image display device 1 and the manner of operation of the image display device 1 are explained. FIG. 1 shows the whole constitution of the image display device 1 of the embodiment of the present invention. The image display device 1 is a retinal scanning display of a type which allows an optical flux to be incident on a pupil 12 of a viewer who is a user of the image display device 1 and projects an image on his/her retina 14. Due to such a constitution, the image display device allows the viewer to visually recognize a virtual image in front of the pupil 12 of a viewer's eye 10.

The image display device 1 includes an optical flux generator 20 which generates an optical flux (laser beams) whose intensity is modulated based on a video signal S supplied from the outside. Further, the image display device 1 includes, between the optical flux generator 20 and the viewer's eye 10, a collimation optical system 61 which collimates the optical flux generated by the optical flux generator 20 and radiated from an optical fiber 100, a horizontal scanning part 70 which scans the optical flux collimated by the collimation optical system 61 in a horizontal direction for an image display, a vertical scanning part 80 which scans the optical flux scanned in the horizontal direction using the horizontal scanning part 70 in a vertical direction for an image display, a relay optical system 75 which is arranged between the horizontal scanning part 70 and the vertical scanning part 80, and a relay optical system 90 which radiates the optical fluxes scanned in the horizontal direction as well as in the vertical direction (hereinafter, referred to as "scanning optical flux") onto the pupil 12.

As shown in FIG. 1, the optical flux generator 20 includes a signal processing circuit 21. A video signal S supplied from the outside is inputted to the signal processing circuit 21. Based on the video signal S, the signal processing circuit 21 generates respective signals and the like which constitute components for synthesizing an image. The signals generated by the signal processing circuit 21 include video signals 22a to 22c of blue (B), green (G) and red (R), a horizontal synchronizing signal Sig1 and a control signal Sig2 used in the horizontal scanning part 70, a vertical synchronizing signal Sig3 used in the vertical scanning part 80 and the like.

Further, the optical flux generator 20 includes a light source part 30 which forms three video signals (B, G, R) 22a to 22c outputted from the signal processing circuit 21 into optical fluxes respectively, and an optical synthesizing part 40 which generates an arbitrary optical flux by combining these three optical fluxes into one optical flux.

The light source part 30 includes a B laser 34 which generates a blue optical flux, a B laser driver 31 which drives the B laser 34, a G laser 35 which generates a green optical flux, a G laser driver 32 which drives the G laser 35, an R laser 36 which generates a red optical flux, and an R laser driver 33 which drives the R laser 36. Here, each laser 34, 35, 36 may be constituted of a semiconductor laser or a solid-state laser provided with a harmonics generation mechanism, for example.

The optical synthesizing part 40 includes collimation optical systems 41, 42, 43 provided for collimating the optical fluxes incident from the light source part 30, dichroic mirrors 44, 45, 46 provided for synthesizing the collimated optical fluxes, and a coupling optical system 47 which guides a synthesized optical flux into the optical fiber 100.

The optical fluxes radiated from the respective lasers 34, 35, 36 are, after respectively being collimated by the collimation optical systems 41, 42, 43, incident on the dichroic mirrors 44, 45, 46. Thereafter, the respective optical fluxes are reflected on the dichroic mirrors 44, 45, 46 or are allowed to pass through the dichroic mirrors 44, 45, 46 selectively corresponding to wavelengths thereof.

To be more specific, the blue optical flux radiated from the B laser 34 is, after being collimated by the collimation optical system 41, incident on the dichroic mirror 44. The green optical flux radiated from the G laser 35 is incident on the dichroic mirror 45 via the collimation optical system 42. The red optical flux radiated from the R laser 36 is incident on the dichroic mirror 46 via the collimation optical system 43.

The optical fluxes of three primary colors which are respectively incident on these three dichroic mirrors 44, 45, 46 are reflected on the dichroic mirrors 44, 45, 46 or are allowed to pass through the dichroic mirrors 44, 45, 46 selectively corresponding to wavelengths thereof, and arrive at the coupling optical system 47 and are converged by the coupling optical system. Then, the converged optical fluxes are outputted to the optical fiber 100.

The horizontal scanning part 70 and the vertical scanning part 80, to bring the optical fluxes incident from the optical fiber 100 into a state which allows the optical fluxes to be projected as an image, scan the optical fluxes in a horizontal direction (for example, a primary direction) as well as in a vertical direction (for example, a secondary direction) to form scanning optical fluxes. The horizontal scanning part 70 and the signal processing circuit 21 which includes a constitutional part for performing a horizontal scanning function as an optical scanning device for horizontal scanning, while the vertical scanning part 80 and the signal processing circuit 21 which includes a constitutional portion for performing vertical scanning function as an optical scanning device for vertical scanning. Further, the optical scanning device for horizontal scanning and the optical scanning device for vertical scanning constitute the optical scanning device which scans optical flux in two-dimensional directions (primary direction and secondary direction).

The horizontal scanning part 70 includes an optical scanning element (optical scanner) 71 for scanning the optical fluxes in the horizontal direction, a horizontal scanning drive circuit 72 which drives the optical scanning element 71, and a displacement state detection circuit 73 which detects a displacement state of a mirror portion 120 described later in the optical scanning element 71. On the other hand, the vertical scanning part 80 includes an optical scanning element 81 for scanning the optical fluxes in the vertical direction, and a vertical scanning drive circuit 82 which drives the optical scanning element 81. Here, the horizontal scanning drive circuit 72 and the vertical scanning drive circuit 82 respectively drive the optical scanning element 71 and the optical canning element 81 based on a horizontal synchronizing signal Sig1, a control signal Sig2, a vertical synchronizing signal Sig3 and the like which are outputted from the signal processing circuit 21. Here, the optical scanning elements 71, 81 are respectively constituted of a Galvano mirror or the like.

Further, the image display device 1 includes a relay optical system 75 which relays the optical fluxes between the horizontal scanning part 70 and the vertical scanning part 80. The light which is scanned in a horizontal direction by the optical scanning element 71 passes through the relay optical system 75 and, thereafter, is scanned by the optical scanning element 81 in a vertical direction, and is radiated to the relay optical system 90 as the scanning optical fluxes.

The relay optical system 90 includes two sets of lenses 91, 94. With respect to the scanning optical fluxes for display which are radiated from the vertical scanning part 80, the first set of lenses 91 makes center lines of the respective optical fluxes parallel to each other and converts the respective optical fluxes into converged optical fluxes. Then, the second set of lenses 94 makes the converged optical fluxes substantially parallel to each other and, at the same time, converts the optical fluxes such that center lines of these optical fluxes are converged on the pupil 12 of the viewer.

2 Explanation of Optical Scanning Element 71

Next, the optical scanning element 71 which constitutes an swing-type optical scanning element for scanning the optical fluxes in the horizontal direction as described above is explained.

(Constitution and Manner of Operation of Optical Scanning Element 71)

Figure 2:
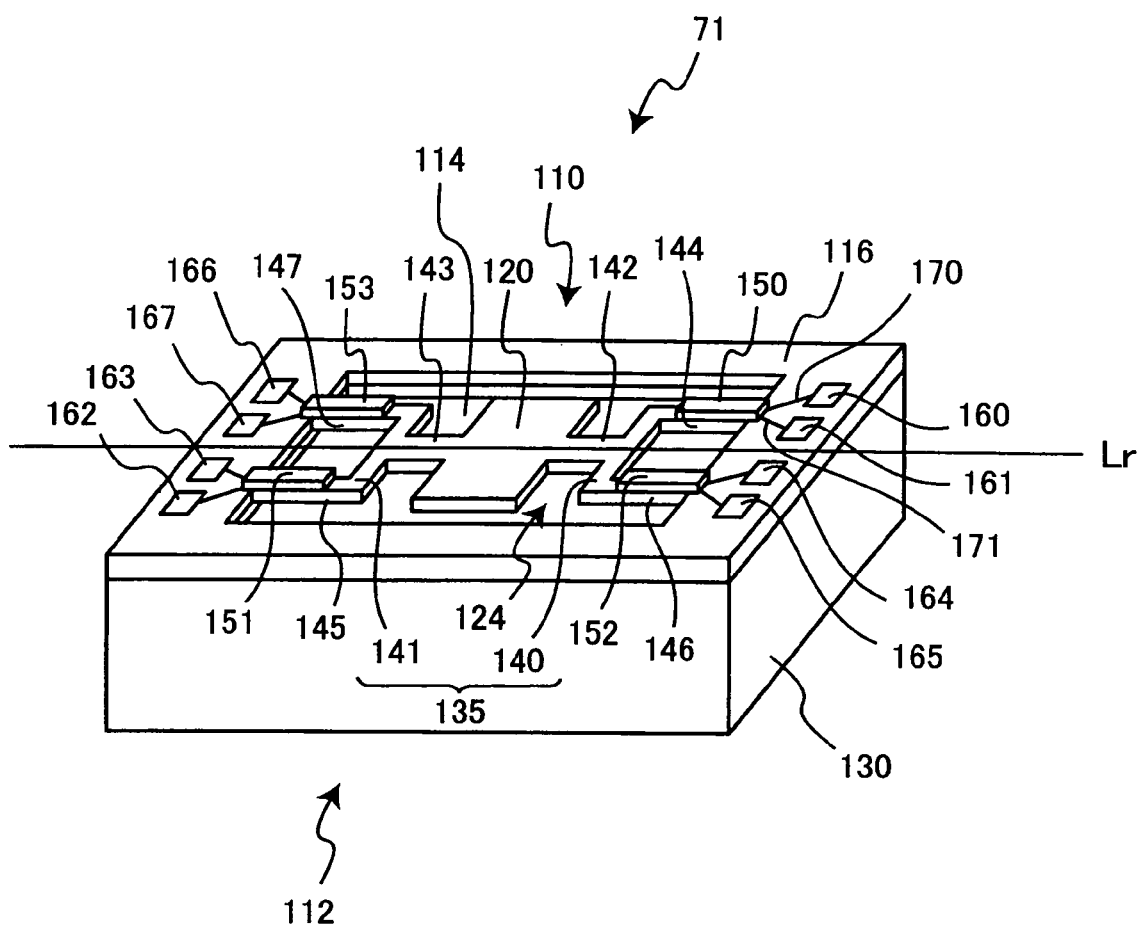
FIG. 2 is a perspective view showing an assembled state of an optical scanning element of the embodiment according to the present invention.
Figure 3:
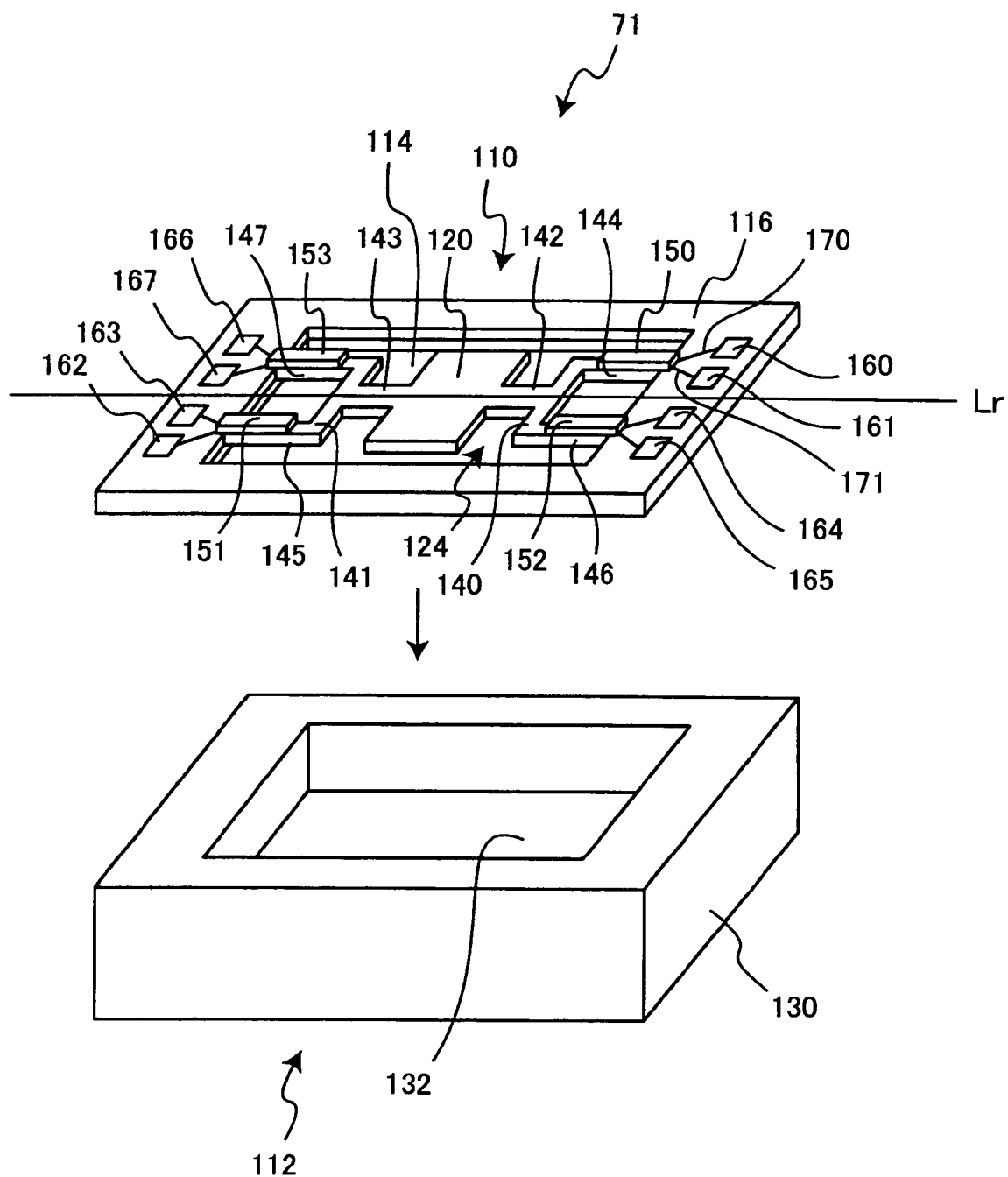
FIG. 3 is an exploded perspective view of the optical scanning element of the embodiment according to the present invention.

First of all, the constitution of the optical scanning element 71 is specifically explained hereinafter. FIG. 2 is a perspective view showing an assembled state of the optical scanning element 71, and FIG. 3 is an exploded perspective view of the optical scanning element 71. As shown in FIG. 2 and FIG. 3, the optical scanning element 71 is constituted by mounting a body portion 110 on a base 112.

For scanning a light spot on the retina 14 in the horizontal direction, the optical scanning element 71 swings an oscillating body 124 which includes a mirror portion 120 having a reflection surface for changing a radiation direction of the light beams by reflecting the light beams. In this embodiment, the oscillating body 124 is configured to be resonated. Due to such resonation of the oscillating body 124, it is possible to swing the mirror portion 120.

As shown in FIG. 3, the optical scanning element 71 includes an approximately rectangular parallelepiped base 112. A recessed portion 132 is formed in a center portion of an upper surface of the base 112 in an open state and, at the same time, a body portion 110 is fixedly mounted on the upper surface of the base 112. Here, the base 112 is arranged and fixedly mounted on a predetermined portion of the image display device 1.

The body portion 110 is made of a material having resiliency such as silicon. Piezoelectric elements 150 to 153 and electrodes 181, 182 and the like described later are formed by a thin film forming method. The body portion 110, as shown in an upper part of FIG. 3, includes a through hole 114 which allows light to pass therethrough and has an approximately rectangular shape in a plan view. Further, an outer side of the body portion 110 forms a fixed frame portion 116 as a base body, while the oscillating body 124 having the mirror portion 120 is formed inside the fixed frame portion 116.

Further, the oscillating body 124 is positioned above an opening of a recessed portion 132 formed in the base 112. The oscillating body 124 is constituted such that the oscillating body 124 does not interfere with the base 112 even during swinging of the oscillating body 124. Here, the base 112 is extremely small in size and hence, the recessed portion 132 is formed by etching, for example.

The oscillating body 124 is an integral body constituted of a plurality of constitutional elements. That is, the oscillating body 124 is constituted of the mirror portion 120 and a spring portion 135 which is connected to the mirror portion 120. Further, the spring portion 135 is constituted of a first beam portion 140 which is connected to one side of the mirror portion 120 and a second beam portion 141 which is connected to another side of the mirror portion 120. Here, the first beam portion 140 is a resilient beam which is constituted of a plate-shaped resilient member 142, a plate-shaped resilient member 144 and a plate-shaped resilient member 146, while the second beam portion 141 is a resilient beam which is constituted of a plate-shaped resilient member 143, a plate-shaped resilient member 145 and a plate-shaped resilient member 147. In this manner, the mirror portion 120 is supported on the beam portions 140, 141, and the beam portions 140, 141 are supported on the fixed frame portion 116.

Here, the oscillating body 124 which includes the mirror portion 120 and the spring portion 135 constitutes a movable member which is configured to be movable relative to the fixed frame portion 116 fixed to the image display device 1.

As shown in FIG. 3, the mirror portion 120 has an approximately rectangular shape and is arranged at an approximately center portion of the body portion 110. The mirror portion 120 is swung about a swing axis Lr which extends in the lateral direction in FIG. 3 so as to change the reflection direction of the optical fluxes incident on the mirror portion 120.

On one side of the mirror portion 120, two resilient members, that is, the resilient members 144, 146 which are arranged parallel to each other are branched from the resilient member 142 with a distance therebetween larger than a width of the resilient member 142. Two resilient members 144, 146 are arranged symmetrically with respect to the swing axis Lr. In the same manner, on the other side of the mirror portion 120, two resilient members, that is, the resilient members 145, 147 which are arranged parallel to each other are branched from the resilient member 143 with a distance therebetween larger than a width of the resilient member 143. Two resilient members 145, 147 are arranged symmetrically with respect to the swing axis Lr. Further, the first beam portion 140 and the second beam portion 141 are arranged at positions which are symmetrical with respect to the mirror portion 120 which is sandwiched between the first beam portion 140 and the second beam portion 141.

Further, with respect to the resilient members 144, 146 which constitute portions of the first beam portion 140, a first piezoelectric element 150 is fixedly mounted on a one-side surface of the resilient members 144 and a second piezoelectric element 152 is fixedly mounted on a one-side surface of the resilient members 146. The first piezoelectric element 150 and the second piezoelectric element 152 respectively have one ends thereof formed as fixed ends which are fixedly connected to the fixed frame portion 116, and have the other ends thereof formed as free ends which are not fixedly connected to the fixed frame portion 116. Here, a first piezoelectric element portion is constituted of the first piezoelectric element 150 and the second piezoelectric element 152.

Figure 4:
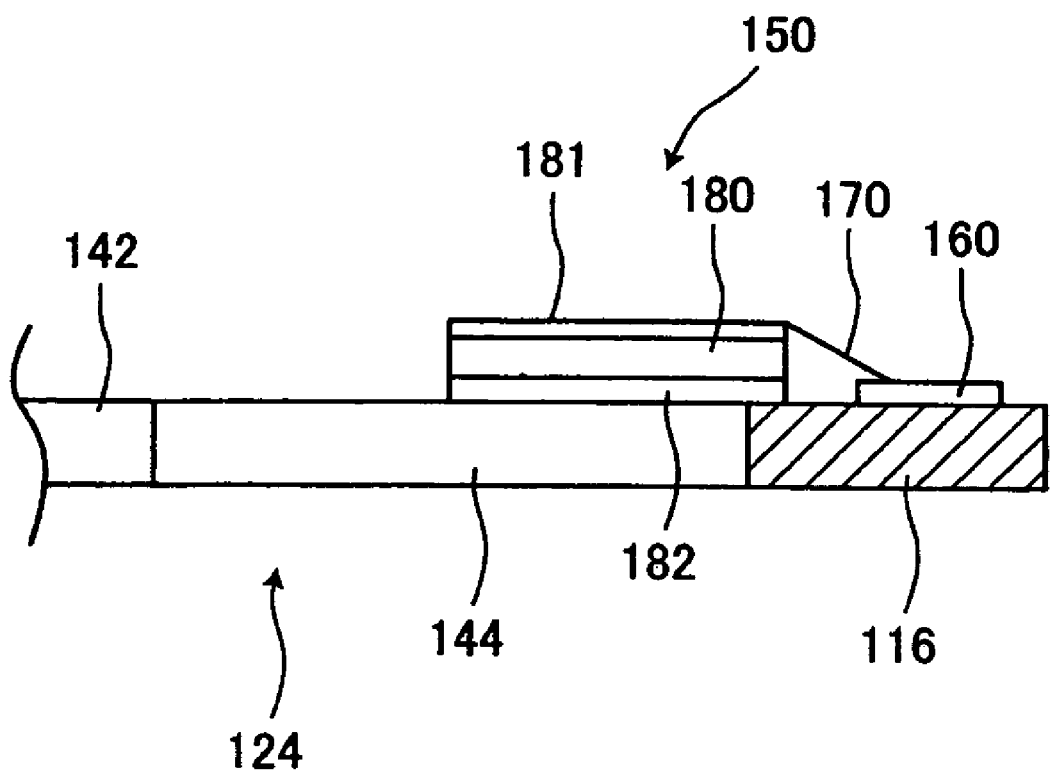
FIG. 4 is a side view of a part of the optical scanning element of the embodiment according to the present invention.

The first piezoelectric element 150 and the second piezoelectric element 152 respectively have the same structure in which a piezoelectric body is sandwiched between an upper electrode and a lower electrode in a direction perpendicular to a surface of the resilient member 144, 146 to which each piezoelectric element 150, 152 is fixed. FIG. 4 shows a side surface of the first piezoelectric element 150 mounted on an upper surface of the resilient member 144. The piezoelectric body 180 is sandwiched between the upper electrode 181 and the lower electrode 182.

Further, the upper electrode 181 and the lower electrode 182 of the first piezoelectric element 150 are respectively connected to input terminals 160, 161 which are mounted on the fixed frame portion 116 using lead lines 170, 171. The upper electrode and the lower electrode of the second piezoelectric element 152 are respectively connected to input terminals 164, 165 which are mounted on the fixed frame portion 116 respectively using lead lines.

In this embodiment, the first piezoelectric element 150 and the second piezoelectric element 152 which constitute a pair respectively function as driving sources and generate torsional oscillations about the swing axis Lr so as to swing the mirror portion 120. This structure is specifically explained hereinafter.

When a voltage is applied between the upper electrode 181 and the lower electrode 182 of the first piezoelectric element 150, the first piezoelectric element 150 is displaced not only in a voltage applying direction but also in a direction orthogonal to the voltage applying direction. Due to the generation of such displacements in the first piezoelectric element 150, the first piezoelectric element 150 is resiliently deformed and is bent upwardly or downwardly. Further, in the same manner, when a voltage is applied between the upper electrode and lower electrode of the second piezoelectric element 152, the second piezoelectric element 152 is also resiliently deformed and is bent upwardly or downwardly. Here, the upward bending or the downward bending of the piezoelectric element is controlled based on whether a voltage which is applied between the electrodes assumes positive polarity or negative polarity.

Further, corresponding to bending of the first piezoelectric element 150 due to the resilient deformation, the resilient member 144 is also bent due to the resilient deformation. In the same manner, corresponding to bending of the second piezoelectric element 152 due to the resilient deformation, the resilient member 146 is also bent due to the resilient deformation. Bending of the resilient members 144, 146 due to the resilient deformation generates the torsional oscillations of the resilient member 142 due to the resilient deformation about the oscillating axis Lr which constitutes a center axis. Due to such torsional oscillations of the resilient member 142, the mirror portion 120 is swung about the swing axis Lr.

Figure 5:
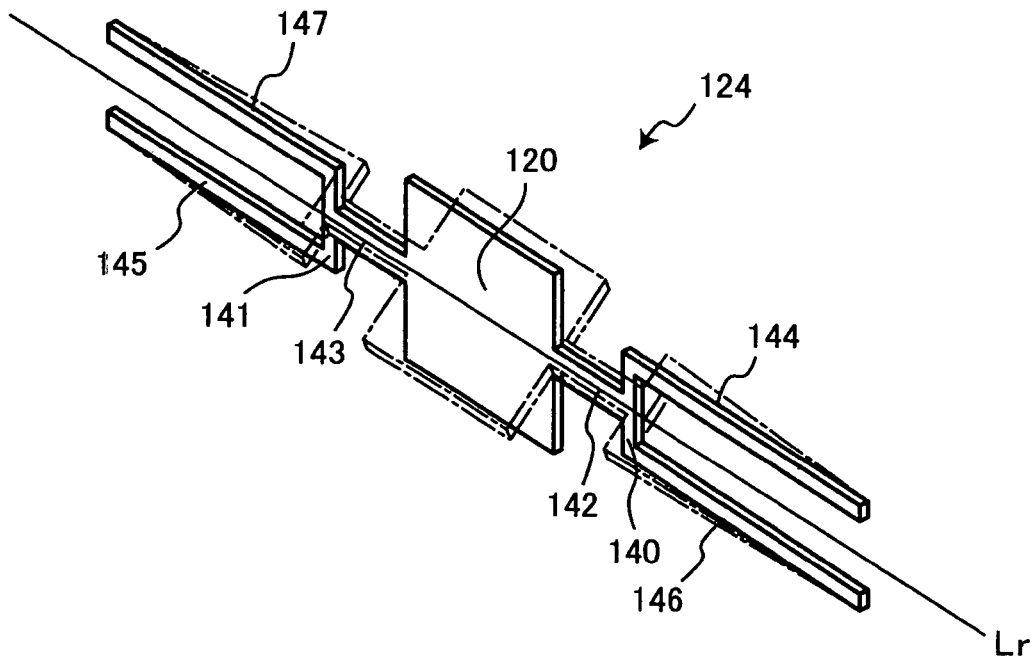
FIG. 5 is a view for explaining torsional oscillations of an oscillating body of the embodiment according to the present invention.

Accordingly, by applying AC voltages having phases opposite to each other between the upper electrode 181 and the lower electrode 182 of the first piezoelectric element 150 as well as between the upper electrode and the lower electrode of the second piezoelectric element 152, the first piezoelectric element 150 and the second piezoelectric element 152 are resiliently deformed and bent such that the free ends of the first piezoelectric element 150 and the second piezoelectric element 152 are displaced in directions opposite to each other, and the first piezoelectric element 150 and the second piezoelectric element 152 repeat upward and downward bending oscillations at a frequency of the AC voltage. The bending oscillations are converted into a rotational movement about the swing axis Lr which constitutes the center axis by way of the first beam portion 140 and hence, the mirror portion 120 is rotated about the swing axis Lr as shown in FIG. 5.

To summarize the above-mentioned constitution and the manner of operation described heretofore, the resilient member 144 and the resilient member 146 have a function of converting linear displacements of the first piezoelectric element 150 and the second piezoelectric element 152 which are fixedly mounted on the resilient member 144 and the resilient member 146 into bending oscillations of the resilient member 144 and the resilient member 146. The resilient members 144, 146 also have a function of converting the bending oscillations into the torsional oscillations of the resilient member 142 about the swing axis Lr. Then, the mirror portion 120 swings about the swing axis Lr due to the torsional oscillations of the resilient member 142. In this manner, by using the piezoelectric elements as the driving sources for biasing the springs, it is possible to easily miniaturize the optical scanning device.

(Resonance of the Optical Scanning Element 71)

Here, the first beam portion 140, the second beam portion 141 and the mirror portion 120 constitute the oscillating body 124 which is configured to be movable relative to the fixed frame portion 116 as described above, and perform the torsional oscillations at an intrinsic resonance frequency with respect to the swing axis Lr which constitutes the center axis.

Q (Quality Factor) of this resonance system amounts to several hundreds and hence, in applying the AC voltage to two piezoelectric elements, that is, the first piezoelectric element 150 and the second piezoelectric element 152, when a frequency of the AC voltage is changed and the changed frequency matches the resonance frequency of the torsional oscillations of the oscillating body 124, amplitude of oscillations of the movable member including the mirror portion 120 becomes extremely large.

By oscillating the movable member at the resonance frequency in this manner, even when electricity supplied to the first piezoelectric element 150 and the second piezoelectric element 152 is small, it is possible to obtain the swing displacement of the mirror portion 120 which is not obtainable by a usual method and hence, power efficiency is extremely enhanced and, at the same time, the optical scanning element 71 can be miniaturized.

In this manner, in the optical scanning element 71, scanning of the optical fluxes is performed by making use of the torsional oscillations of the oscillating body 124. However, in this oscillating body, not only the torsional oscillations but also subsidiary resonance oscillations other than the torsional oscillations are generated. As such subsidiary resonance oscillations, lateral oscillations and longitudinal oscillations are named.

Figure 6:
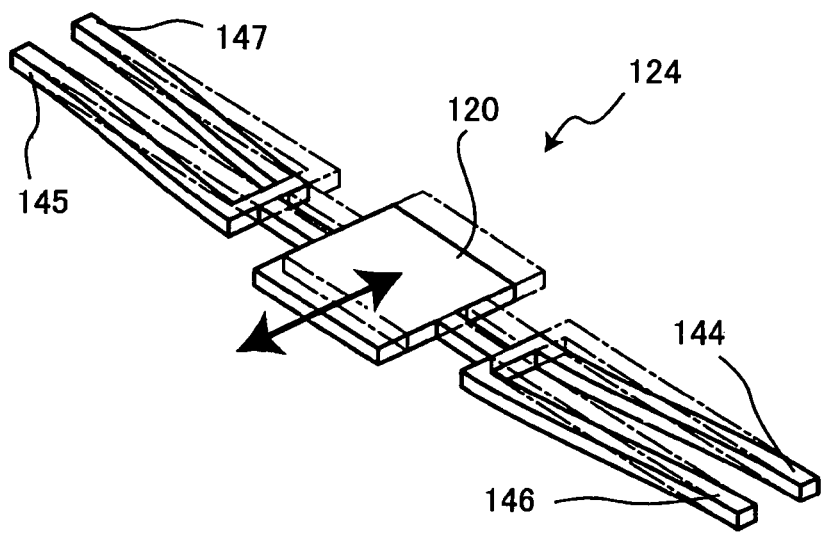
FIG. 6 is a view for explaining lateral oscillations of the oscillating body of the embodiment according to the present invention.
Figure 7:
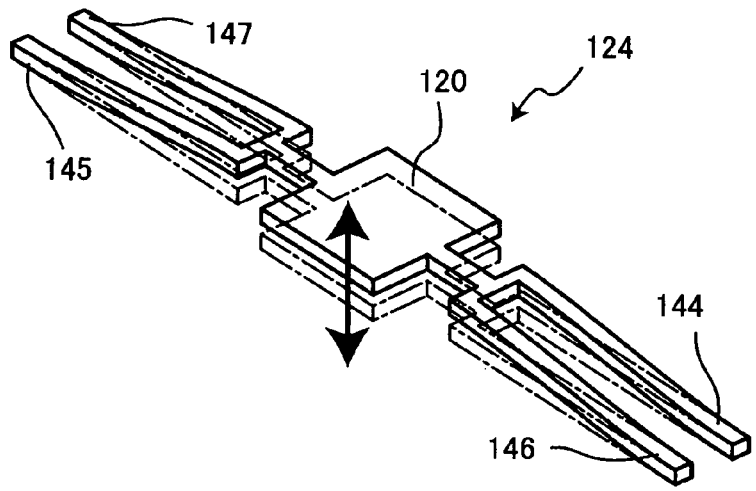
FIG. 7 is a view for explaining longitudinal oscillations of the oscillating body of the embodiment according to the present invention.
Figure 8:
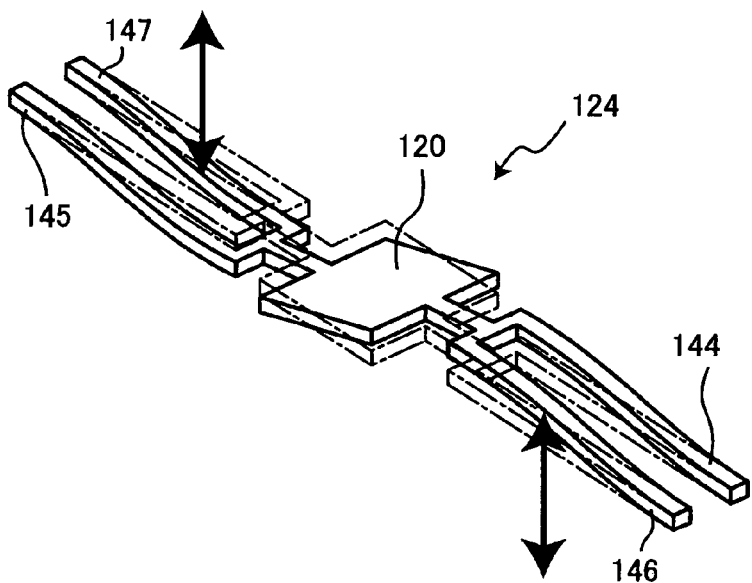
FIG. 8 is a view for explaining twofold longitudinal oscillations of the oscillating body of the embodiment according to the present invention.

The lateral oscillations imply, as shown in FIG. 6, a phenomenon in which the mirror portion 120 of the oscillating body 124 oscillates (linearly reciprocates) in a direction parallel to the reflection surface of the mirror portion 120. Further, the longitudinal oscillations imply, as shown in FIG. 7, a phenomenon in which the mirror portion 120 of the oscillating body 124 oscillates (linearly reciprocates) in a direction perpendicular to the reflection surface of the mirror portion 120. The longitudinal oscillations are first-order oscillations which have one antinode and two nodes. Further, twofold longitudinal oscillations are, as shown in FIG. 8, second-order oscillations which have two antinodes and three nodes. Here, the torsional oscillations imply the phenomenon in which the mirror portion 120 of the oscillating body swings with respect to the swing axis Lr which constitutes the center axis as described above.

Figure 9:
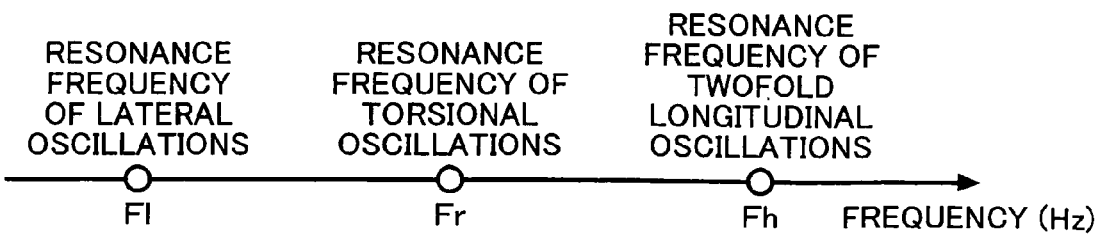
FIG. 9 is a view for explaining oscillation characteristic of the optical scanning element of the embodiment according to the present invention.

Here, the explanation is made hereinafter assuming that, as a characteristic of the optical scanning element 71, the subsidiary resonance oscillations shown in FIG. 9 are present. That is, as the characteristic of the optical scanning element 71 of this embodiment, a resonance frequency Fl of lateral oscillations is present in a region lower than the resonance frequency Fr of the torsional oscillations of the oscillating body 124, and a resonance frequency Fh of twofold longitudinal oscillations is present in a region higher than the resonance frequency Fr of the torsional oscillations of the oscillating body 124.

When the subsidiary resonance oscillations such as the lateral oscillations or the twofold longitudinal oscillations are generated in the oscillating body 124, there is a possibility that the spring portion 135 is damaged depending on the duration time of the subsidiary resonance.

When the mirror portion 120 is swung at the resonance frequency Fr of the torsional oscillations by driving the spring portion of the optical scanning element 71, a drive signal having a frequency equal to the resonance frequency Fr of the torsional oscillations is applied to the optical scanning element 71 from the horizontal scanning drive circuit 72. Here, the oscillation frequency of the mirror portion 120 of the oscillating body 124 does not immediately become equal to the resonance frequency Fr of the torsional oscillations and is increased gradually.

Accordingly, before the oscillation frequency of the mirror portion 120 of the oscillating body 124 reaches the resonance frequency Fr of the torsional oscillations, the oscillation frequency of the mirror portion 120 passes the resonance frequency Fl of the subsidiary resonance oscillations and hence, the subsidiary resonance oscillations are surely generated.

In view of such a phenomenon, this embodiment is provided for suppressing damages on the spring portion 135 of the oscillating body 124 by making a generation time of subsidiary resonance frequency Fl short. This operation is explained in detail in paragraph [3. Driving of optical scanning element 71] of this specification.

(Detection of Displacement of Mirror Portion 120 of Optical Scanning Element 71)

The second beam portion 141 is positioned on the other side of the mirror portion 120 as described above and is formed symmetrically with the first beam portion 140 with respect to the swing axis Lr which constitutes a center axis. The rotational oscillations generated by the first beam portion 140 are transmitted to the second beam portion 141 by way of the mirror portion 120. As a result, the displacements similar to the displacements of the first beam portion 140 are generated in the second beam portion 141. That is, the resilient member 143 is resiliently deformed and is rotationally oscillated in the approximately same manner as the resilient member 142 about the swing axis Lr which constitutes the center axis, and the resilient member 145 is resiliently deformed and generates the bending oscillations in the approximately same manner as the resilient member 146, and the resilient member 147 is resiliently deformed and generates the bending oscillations in the approximately same manner as the resilient member 144.

In this manner, the displacements similar to the displacements of the first beam portion 140 are generated in the second beam portion 141. FIG. 5 shows an example in which the displacements are generated in the oscillating body 124 in this manner.

In FIG. 5, a solid line indicates a position of the first beam portion 140, a position of the second beam portion 141 and a position of the mirror portion 120 when a voltage is not applied to the first piezoelectric element 150 and the second piezoelectric element 152. Further, a broken line indicates a position of the first beam portion 140, a position of the second beam portion 141 and a position of the mirror portion 120 when the AC voltage is applied to the first piezoelectric element 150 and the second piezoelectric element 152 at a certain voltage level.

Here, as shown in FIG. 2 and FIG. 3, the fourth piezoelectric element 153 is fixedly secured to the resilient member 147 of the second beam portion 141. When such bending oscillations as described above are generated in the resilient member 147, the bending oscillations are converted into a voltage by the fourth piezoelectric element 153 and a voltage signal corresponding to a torsional quantity of the second beam portion 141 is outputted from the output terminals 166, 167. Further, in the same manner, the third piezoelectric element 151 is fixedly secured to the resilient member 145 of the second beam portion 141. When such bending oscillations as described above are generated in the resilient member 145, the bending oscillations are converted into a voltage by the third piezoelectric element 151 and a voltage signal corresponding to a torsional quantity of the second beam portion 141 is outputted from the output terminals 162, 163. Here, a second piezoelectric element portion is constituted of the third piezoelectric element 151 and the fourth piezoelectric element 153.

With the use of the third piezoelectric element 151 and the fourth piezoelectric element 153 in this manner, the signal corresponding to the torsional quantity of the second beam portion 141 can be generated and hence, a light beam detector which detects the displacement of the mirror portion becomes unnecessary whereby it is possible to miniaturize the optical scanning device.

In this embodiment, the optical scanning device includes a displacement state detection circuit 73 which picks up a voltage generated in the third piezoelectric element 151 as a first displacement detection signal and, at the same time, picks up a voltage generated in the fourth piezoelectric element 153 as a second displacement detection signal. The displacement state detection circuit 73 detects a displacement state of the mirror portion 120 of the oscillating body 124. Here, the displacement state detection circuit 73 is configured to output the first displacement detection signal and the second displacement detection signal. Hereinafter, either one of these signals may be referred to as a displacement detection signal Sig6 or these signals may be collectively referred to as the displacement detection signal Sig6.

3. Driving of Optical Scanning Element

Figure 10:
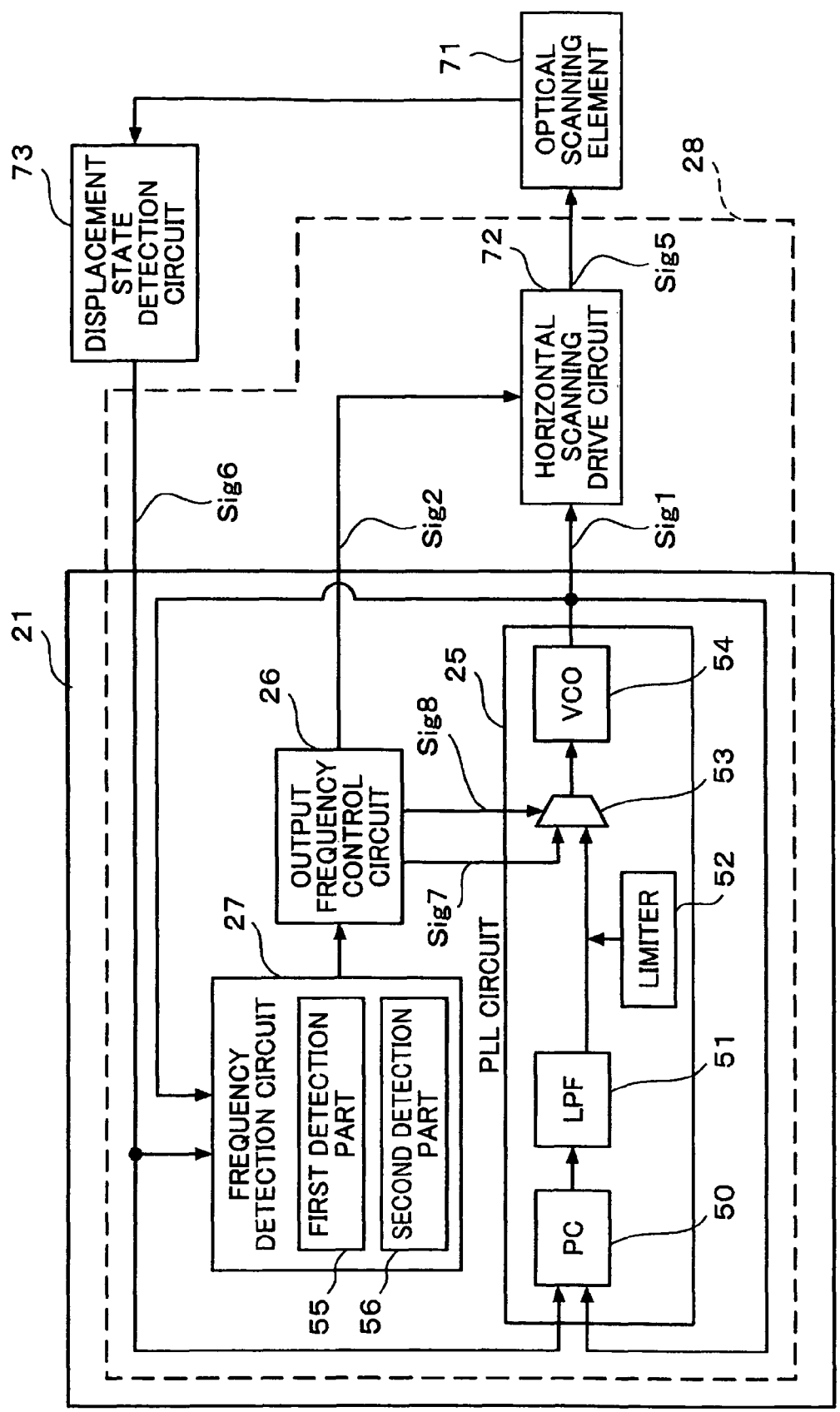
FIG. 10 is a schematic block diagram of a part of the image display device of the embodiment according to the present invention which functions as an optical scanning device for horizontal scanning.

Next, a driving method of the optical scanning element 71 of this embodiment is explained. FIG. 10 is a conceptual block diagram of a part which functions as the optical scanning device for horizontal scanning in this embodiment. The part which functions as the optical scanning device for horizontal scanning is constituted of, as described above, the horizontal scanning part 70 and the signal processing circuit 21 which includes the constitutional part for horizontal scanning. The signal processing circuit 21 and the horizontal scanning drive circuit 72 constitute a drive signal outputting part 28. The drive signal outputting part 28 has a function of generating and outputting a drive signal Sig5. By applying the drive signal Sig5 to the piezoelectric elements 150, 152 of the optical scanning element 71, it is possible to oscillate the spring portion 135.

(Constitution for Driving Optical Scanning Element)

First of all, the constitution for driving the optical scanning element 71 is explained.

As shown in FIG. 10, the signal processing circuit 21 includes a PLL circuit 25, an output frequency control circuit 26 and a frequency detection circuit 27.

The PLL circuit 25 includes a phase comparator (PC) 50, a low-pass filter (LPF) 51, a limiter 52, a selector 53 and a voltage controlled oscillator (VCO) 54. The phase comparator 50 compares a phase of one displacement detection signal (a first displacement detection signal or a second displacement detection signal) among displacement detection signals Sig6 which are outputted from the displacement state detection circuit 73 and a phase of a horizontal synchronizing signal Sig1 which is an output signal of the PLL circuit 25 and outputs a result of the comparison. The low-pass filter 51 performs filtering of a signal outputted from the phase comparator 50 and generates and outputs a voltage signal corresponding to the phase difference between the displacement detection signal Sig6 and the horizontal synchronizing signal Sig1 for compensating a phase characteristic and an amplification characteristic of the whole PLL loop. The low-pass filter 51 is also usually referred to as a loop filter and is often used in combination with an amplifier not shown in the drawing. The limiter 52 is a limiter which limits the voltage signal outputted from the low-pass filter 51 so that the voltage signal does not become larger than a predetermined set voltage. The selector 53 is a selection circuit which selects and outputs either one of an output from the low-pass filter 51 and a voltage signal Sig7 outputted from the output frequency control circuit 26. The selector 53 is controlled in response to a control signal Sig8 from the output frequency control circuit 26. The voltage controlled oscillator 54 is a circuit which generates and outputs a signal of a frequency corresponding to a voltage level of a voltage signal outputted from the selector 53 as a horizontal synchronizing signal Sig1.

The output frequency control circuit 26 is a circuit which controls the frequency of the horizontal synchronizing signal Sig1 which is an output signal from the PLL circuit 25. The output frequency control circuit 26 outputs the horizontal synchronizing signal Sig1 of a specific frequency which is a frequency between the resonance frequency Fl of the lateral oscillations which constitutes a first resonance frequency and the resonance frequency Fh of the twofold longitudinal oscillations which constitutes a second resonance frequency and is higher than the resonance frequency Fr of the torsional oscillations (hereinafter, referred to as "initial oscillation frequency F0") and, thereafter, shifts the frequency of the horizontal synchronizing signal Sig1 to the resonance frequency Fr of the torsional oscillations.

The frequency detection circuit 27 includes a first detection portion 55 which detects, based on the oscillation frequency of the mirror portion 120 of the oscillating body 124 (hereinafter, referred to as "oscillation frequency Fx"), the resonance frequency Fr of the torsional resonance of the oscillating body 124 and a second detection part 56 which detects whether or not the oscillation frequency Fx of the mirror portion 120 passes the first resonance frequency.

The first detection part 55, after the mirror portion 120 of the optical scanning element 71 starts oscillations and starting processing of the optical scanning element 71 described later is finished, operates the PLL circuit 25 corresponding to a displacement state of the mirror portion 120 and, thereafter, the oscillation frequency Fx of the mirror portion 120 when the oscillation frequency Fx becomes stable is detected thus detecting the resonance frequency Fr of the torsional oscillations in the oscillating body 124.

Then, the first detection part 55 informs the output frequency control circuit 26 of information of the resonance frequency Fr of the torsional oscillations detected in this manner. The output frequency control circuit 26, upon reception of the information, adjusts the initial oscillation frequency F0 based on the resonance frequency Fr of the informed torsional oscillations.

Here, a range of the resonance frequency Fl of the lateral oscillations and a range of the resonance frequency Fh of the twofold longitudinal oscillations in the oscillating body 124 are set in a memory part of the output frequency control circuit 26 as predicted values preliminarily including irregularities. A frequency which is higher than the resonance frequency Fl of the lateral oscillations, can shorten a time at which the frequency passes the resonance frequency Fl of the lateral oscillations and does not exceed the resonance frequency Fh of the twofold longitudinal oscillations is set as the initial oscillation frequency F0. Further, the initial oscillation frequency F0 is set to a value which falls within a lock-in range of the PLL circuit 25 to facilitate shifting of the torsional oscillators to the resonance frequency Fr. Here, the output frequency control circuit 26 may adjust the initial oscillation frequency F0 as follows. That is, the resonance frequency F1 of the lateral oscillations and the resonance frequency Fh of the twofold longitudinal oscillations are detected by a second detection part described later in the frequency detection circuit 27, a detection result is supplied to the output frequency control circuit 26, and the output frequency control circuit 26 adjusts the initial oscillation frequency F0 using the information on the resonance frequency F1 of the lateral oscillations and the information on the resonance frequency Fh of the twofold longitudinal oscillations.

The second detection part 56 detects, based on the displacement detection signal Sig6 outputted from the displacement state detection circuit 73, whether or not the oscillation frequency Fx of the mirror portion 120 passes the resonance frequency F1 of the lateral oscillations. When longitudinal oscillations or lateral oscillations are generated in the oscillating body 124, the displacement detection signal Sig6 has a waveform different from a waveform at the time of the torsional oscillations and hence, it is possible to detect whether or not the oscillation frequency Fx of the mirror portion 120 passes the resonance frequency F1 of the lateral oscillations. That is, when the longitudinal oscillations or the lateral oscillations are generated in the oscillating body 124, as shown in FIG. 6 and FIG. 7, bending oscillations are generated in the resilient member 145 and the resilient member 147 in the same direction and hence, a phase of the first displacement detection signal (voltage generated in the third piezoelectric element 151) and a phase of the second displacement detection signal (voltage generated in the fourth piezoelectric element 153) become equal to each other. By detecting such a state, the second detection part 56 can detect the generation of the longitudinal oscillations or the lateral oscillations in the oscillating body 124.

Further, the second detection part 56 can also detect, based on the displacement detection signal Sig6 outputted from the displacement state detection circuit 73, whether or not the oscillation frequency Fx of the mirror portion 120 passes the resonance frequency Fh of the twofold longitudinal oscillations. When the twofold longitudinal oscillations are generated in the oscillating body 124, the displacement detection signal Sig6 has a waveform different from a waveform at the time of the torsional oscillations. Due to this phenomenon, the second detection part 56 detects whether or not the oscillation frequency Fx of the mirror portion 120 passes the resonance frequency Fh of the twofold longitudinal oscillations. That is, when the twofold longitudinal oscillations are generated in the oscillating body 124, as shown in FIG. 8, the twofold longitudinal oscillation constitutes the second-order oscillation which has two antinodes and three nodes and hence, the second detection part 56 can detect such a state based on phase of the first displacement detection signal and phase of a second displacement detection signal.

Further, the horizontal scanning drive circuit 72 includes an amplifier which is configured to generate the drive signal Sig5 having a first voltage V1 by amplifying amplitude of the inputted horizontal synchronizing signal Sig1 and outputs the drive signal Sig5. By changing a voltage amplification factor of the amplifier using a switch, the amplifier can increase a voltage level of the drive signal Sig5 by setting the amplitude of the horizontal synchronizing signal Sig1 to a second voltage V2 higher than the first voltage V1. Further, the horizontal scanning drive circuit 72 stops outputting of the drive signal Sig5 by setting the voltage amplification factor of the amplifier to 0 by changing over the switch. Starting or stopping of the outputting of the drive signal Sig5 from the horizontal scanning drive circuit 72 and a change of the voltage level of the drive signal Sig5 are performed based on a control signal Sig2 outputted from the output frequency control circuit 26.

(Driving method of Optical Scanning Element 71)

Next, the driving method of the optical scanning element 71 is explained in conjunction with the drawings. FIG. 11A to FIG. 11D are views showing states of waveforms of respective signals at the time of starting an operation of the optical scanning element 71, and FIG. 12 is a flowchart of processing at the time of starting the operation of the optical scanning element 71.

Figure 11A:
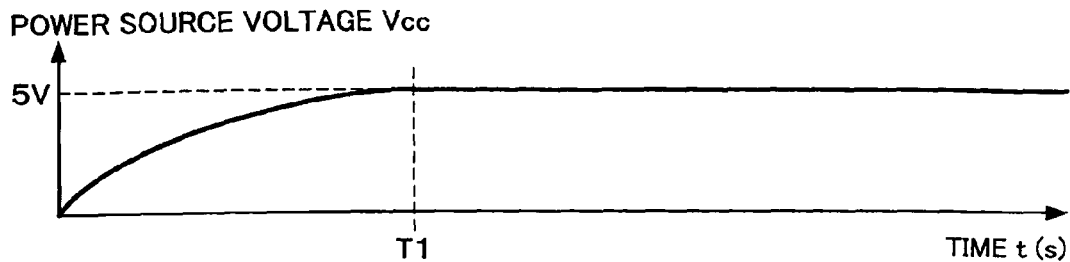
FIG. 11A to FIG. 11D are views for explaining a driving method of the optical scanning element of the embodiment according to the present invention.

The drive signal outputting part 28 performs the starting processing of the optical scanning element 71 when the power source of the image display device 1 is turned on and a power source voltage Vcc assumes a predetermined level (here, 5V) (see T1 of FIG. 11A).

Figure 12:
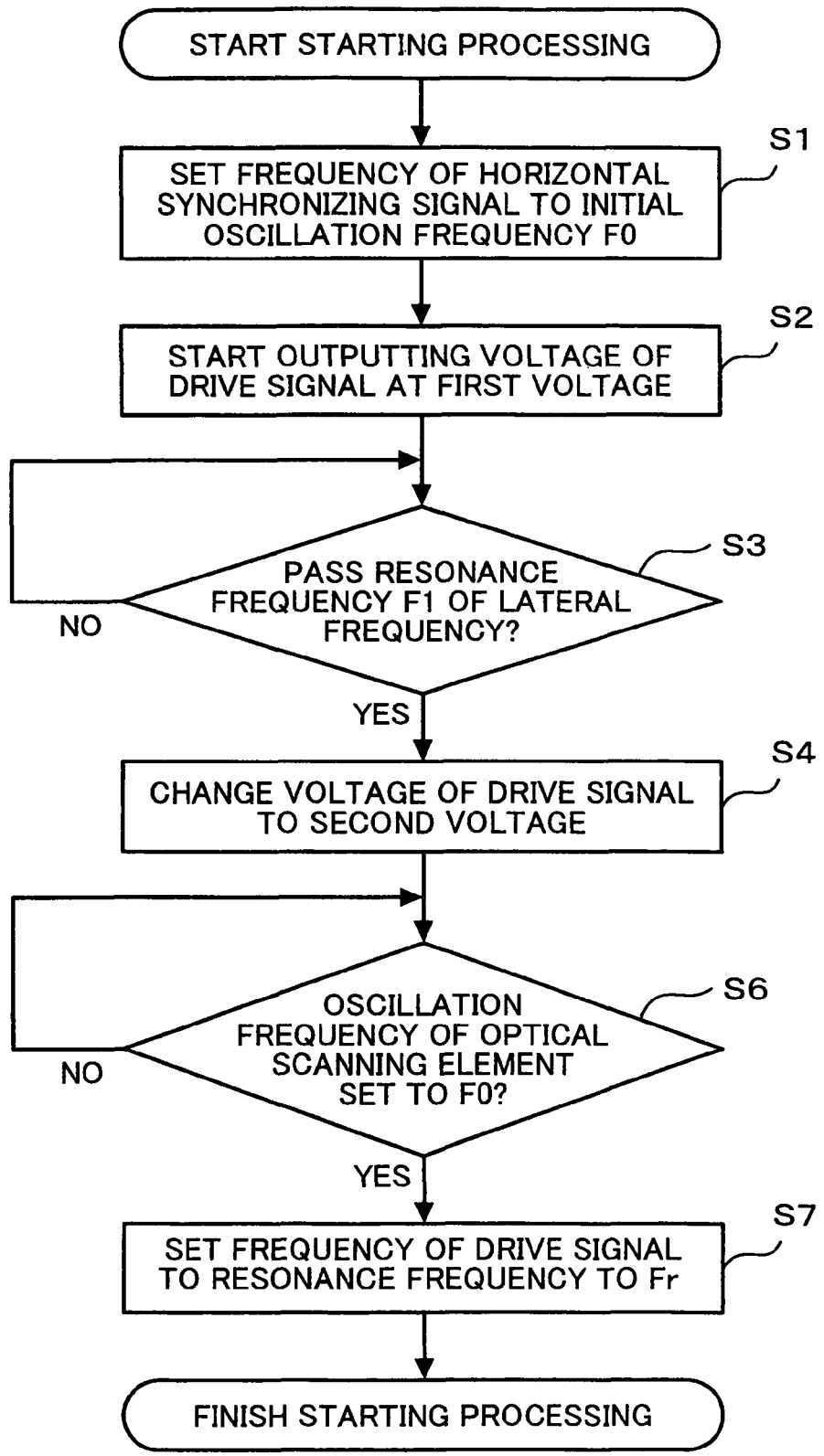
FIG. 12 is a view for explaining a driving method of the optical scanning element of the embodiment according to the present invention.

First of all, the drive signal outputting part 28 sets the frequency of the horizontal synchronizing signal Sig1 to the initial oscillation frequency F0 (step S1 in FIG. 12). Here, the output frequency control circuit 26 stops outputting of the drive signal Sig5 by controlling the horizontal scanning drive circuit 72.

Figure 11B:
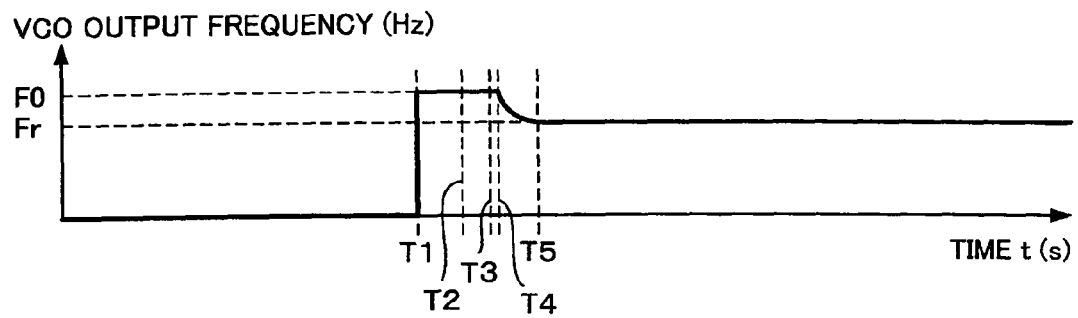

In this processing, the drive signal outputting part 28 is operated as follows. First of all, the output frequency control circuit 26 selects the voltage signal Sig7 outputted from the output frequency control circuit 26 and outputs the control signal Sig8 to be outputted to the selector 53 to control the selector 53. Next, the output frequency control circuit 26 picks up the information of the initial oscillation frequency F0 which is stored in the memory part in the inside of the output frequency control circuit 26 and outputs a voltage corresponding to the initial oscillation frequency F0 as the voltage signal Sig7. The voltage controlled oscillator 54 generates the horizontal synchronizing signal Sig1 having the initial oscillation frequency F0 corresponding to the inputted voltage signal Sig7. The state of frequency of the horizontal synchronizing signal Sig1 at this point of time is shown in FIG. 11B.

Figure 11C:
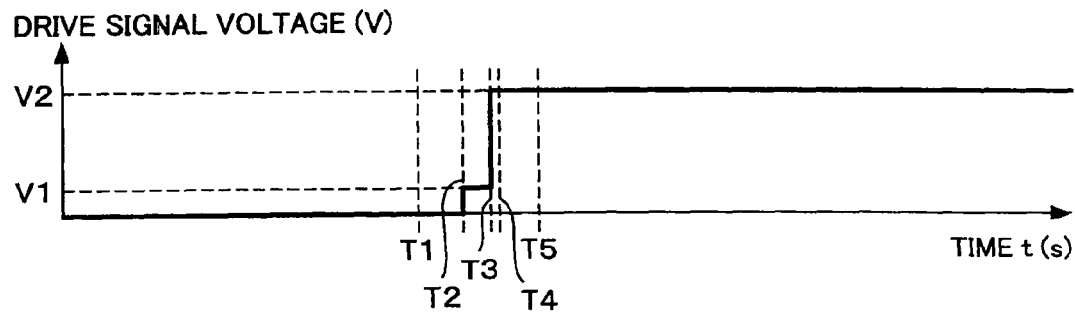

The horizontal synchronizing signal Sig1 which the PLL circuit 25 outputs is inputted to the frequency detection circuit 27. The frequency detection circuit 27 detects the frequency of the horizontal synchronizing signal Sig1 and informs the output frequency control circuit 26 of the frequency. When the output frequency control circuit 26 determines that the frequency of the informed horizontal synchronizing signal Sig1 assumes the initial oscillation frequency F0, the output frequency control circuit 26 outputs the control signal Sig2 to the horizontal scanning drive circuit 72 thus requiring the horizontal scanning drive circuit 72 to generate the drive signal Sig5 by adjusting a voltage level of the horizontal synchronizing signal Sig1 to the first voltage V1 and to output such a drive signal Sig5 to the horizontal scanning element 71. The horizontal scanning drive circuit 72 applies, as the drive signal Sig5, a first drive signal which is obtained by setting the voltage level of the horizontal synchronizing signal Sig1 to the first voltage V1 to the first piezoelectric element 150 of the optical scanning element 71 and, at the same time, applies, as the drive signal Sig5, a second drive signal having a phase opposite to a phase of the first drive signal to the second piezoelectric element 152 of the optical scanning element 71 (step S2 in FIG. 12). FIG. 11C shows the transition of the voltage level of the drive signal Sig5. It is understood from the drawing that the drive signal Sig5 of the first voltage V1 is outputted during a time between timing T2 and timing T3.

When the drive signal Sig5 is applied to the optical scanning element 71, the spring portion 135 is driven based on the drive signal Sig5 and the mirror portion 120 starts oscillations thereof.

Next, based on the displacement detection signal Sig6 which is outputted from the displacement state detection circuit 73, it is determined whether or not the oscillation frequency Fx of the mirror portion 120 passes the resonance frequency Fl of the lateral oscillations (step S3 of FIG. 12).

Whether or not the oscillation frequency Fx of the mirror portion 120 passes the resonance frequency Fl of the lateral oscillation is determined in the drive signal outputting part 28 as follows.

That is, the displacement detection signal Sig6 outputted from the displacement state detection circuit 73 is inputted to the frequency detection circuit 27. The frequency detection circuit 27 detects the oscillation frequency Fx of the mirror portion 120 and informs the output frequency control circuit 26 of the oscillation frequency Fx. In the output frequency control circuit 26, a predicted value of the resonance frequency Fl of the lateral oscillations is set in the memory part of the output frequency control circuit 26. Based on the predicted value, the output frequency control circuit 26 determines whether or not the oscillation frequency Fx of the mirror portion 120 passes the resonance frequency Fl of the lateral oscillation.

In this processing, when it is determined that the oscillation frequency Fx of the mirror portion 120 becomes or passes the resonance frequency Fl of the lateral oscillation (step S3 in FIG. 12: YES), the output frequency control circuit 26 outputs the control signal Sig2 to the horizontal scanning drive circuit 72 requiring the horizontal scanning drive circuit 72 to generate the drive signal Sig5 whose voltage is changed to the second voltage V2 higher than the first voltage V1 and to output such a drive signal Sig5 to the optical scanning element 71. The horizontal scanning drive circuit 72 changes the voltage of the drive signal Sig5 from the first voltage V1 to the second voltage V2 (step S4 in FIG. 12). FIG. 11C shows the transition of the voltage level of the drive signal Sig5. As can be understood from the drawing, the voltage of the drive signal Sig5 is changed from the first voltage V1 to the second voltage V2 at timing T3.

Thereafter, the drive signal outputting part 28 determines whether or not the oscillation frequency Fx of the mirror portion 120 becomes or passes the resonance frequency Fr of the torsional oscillations (step S6 in FIG. 12). This determination is made by the output frequency control circuit 26 based on whether or not the initial resonance frequency F which is set in the memory part in the output frequency control circuit 26 agrees with the oscillation frequency Fx of the mirror portion 120 detected by the frequency detection circuit 27.

In this processing, when it is determined that the oscillation frequency Fx of the optical scanning element 71 becomes the initial resonance frequency F0 (step S6 in FIG. 12: YES), the drive signal outputting part 28 sets the frequency of the drive signal Sig5 to the resonance frequency Fr of the torsional oscillations (step S7 in FIG. 12). This processing is performed by allowing the output frequency control circuit 26 to control the selector 53 such that the selector 53 outputs an output from the low-pass filter 51 to the voltage controlled oscillator 54. That is, the displacement state detection circuit 73 generates the displacement detection signal Sig6 indicative of a displacement state of the optical scanning element 71 operated in response to the drive signal Sig5 which is generated by the horizontal scanning drive circuit 72 based on the horizontal synchronizing signal Sig1 from the PLL circuit 25. Then, the displacement detection signal Sig6 is inputted to the PLL circuit 25. Due to such processing, the oscillating body 124 is controlled to generate resonance due to torsional oscillations.

Figure 11D:
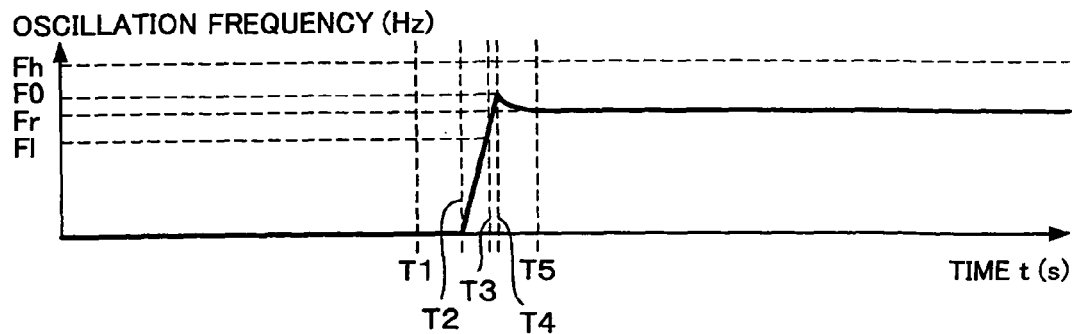

In this manner, in the drive signal outputting part 28, when the frequency of the drive signal Sig5 is set to the resonance frequency Fr, the frequency of the drive signal outputted from the horizontal scanning drive circuit 72 is shifted to the resonance frequency Fr of the torsional oscillations. FIG. 11D shows the transition of the frequency of the drive signal Sig5. As can be understood from the drawing, the frequency of the drive signal Sig5 is shifted to the resonance frequency Fr during a time from timing T4 to timing T5.

As has been described heretofore, this embodiment is directed to the optical scanning element which scans light by generating resonance oscillations of the mirror portion 120 in a swinging state by resonance oscillations due to the torsional oscillations. According to the optical scanning element of this embodiment, even when the optical scanning element 71 having the resonance frequency Fl of the lateral oscillations and the resonance frequency Fh of the twofold longitudinal oscillations which generate the subsidiary resonance oscillations consisting of longitudinal oscillations or lateral oscillations on a lower region side and a higher region side of the resonance frequency of the torsional oscillations is driven, it is possible to drive the optical scanning element while suppressing the damage on the spring portion. Here, the subsidiary resonance oscillations present on the lower region side may not be always the lateral oscillations but may be the longitudinal oscillations or twofold longitudinal oscillations. Further, the subsidiary resonance oscillations present on the higher region side may not be always the twofold longitudinal oscillations but may be the lateral oscillations or the longitudinal oscillations. That is, this embodiment is applicable to any optical scanning element in which the subsidiary resonance oscillations are generated on the lower region side and the higher region side of the resonance frequency of the torsional oscillations.

Further, when individual differences or irregularities exist among the optical scanning elements 71, irregularities are generated in the resonance frequency Fr of the torsional oscillations and hence, it is necessary to search for the resonance frequency Fr of the torsional oscillations in a certain frequency range. Then, depending on a range in which the resonance frequency Fr of the torsional oscillations is searched for, there is a possibility that the frequency range includes subsidiary resonance frequency therein. Also in this case, there is a possibility that the spring portion is damaged due to energy generated when the oscillation frequency Fx of the mirror portion 120 passes the subsidiary resonance frequency.

In the optical scanning element 71 of this embodiment, however, the predicted value which falls within a range of subsidiary resonance frequency is preliminarily set and hence, the initial signal frequency F0 can be properly set.

Further, although the subsidiary resonance frequency can be detected by the frequency detection circuit 27 as described above, in this frequency detection processing, a voltage of the drive signal Sig5 outputted from the horizontal scanning drive circuit 72 can be set to a value smaller than a voltage with which the optical flux is scanned (for example, the first voltage V1). In this case, it is possible to reduce energy which is generated when the oscillation frequency Fx of the mirror portion 120 passes the subsidiary resonance frequency and hence, the spring portion 135 suffers less damages.

Here, in the above-mentioned embodiment, the drive signal outputting part 28 includes the second detection part 56 for detecting whether or not the oscillation frequency Fx of the mirror portion 120 passes the resonance frequency F1 of the lateral oscillations. However, the drive signal outputting part 28 may include a memory part which stores information on a period which is predicted and preset as a period until the oscillation frequency Fx of the mirror portion 120 passes the resonance frequency F1 of the lateral oscillations.

For example, as shown in FIG. 13, when a time during which the drive signal Sig5 of the first voltage V1 is outputted is set to less than Ta(ms), a time during which the drive signal Sig5 of the second voltage V2 is outputted is set more than Ta(ms), and a lapse of time Ta(m) counted from a point of time that outputting of the drive signal Sig5 to the optical scanning element 71 is started is Ta(ms) or more in the drive signal outputting part 28, it is determined that the oscillation frequency Fx of the mirror portion 120 passes the resonance frequency F1 of the lateral oscillations. Due to such processing, the detection of the oscillation frequency Fx of the mirror portion 120 is unnecessary and hence, it is possible to easily change the voltage from the first voltage to the second voltage.

Some embodiments of the present invention have explained in detail in conjunction with the drawings heretofore. However, these embodiments constitute merely examples, and the present invention can be realized in various modes in a form of modifications and improvements based on knowledge of persons skilled in the art.

For example, although the processing of the present invention has been made by taking the horizontal scanning as an example, the same processing may be performed with respect to the vertical scanning.

Further, in the above-mentioned embodiment, as the signal to be inputted to the voltage controlled oscillator 54, with the use of the selector 53, either one of the output from the low-pass filter 51 and the voltage signal Sig7 outputted from the output frequency control circuit 26 may be selected and outputted. However, the present invention may use a synthesizing amplifier (differential amplifier) in place of the selector 53. That is, the present invention may use the synthesizing amplifier which synthesizes the output from the low-pass filter 51 and the voltage signal Sig7 outputted from the output frequency control circuit and amplifies the synthesized signal.

What is claimed is:

1. An optical scanning device comprising:
an optical scanning element which includes a mirror portion having a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being also configured to generate subsidiary resonance oscillations consisting of longitudinal oscillations or lateral oscillations at a first resonance frequency on a lower region side and at a second resonance frequency on a higher region side with respect to a resonance frequency of the resonance oscillations in the swinging state due to the torsional oscillations; and
a drive signal outputting part which is configured to output a drive signal for oscillating the spring portion at a specific frequency which is a frequency between the first resonance frequency and the second resonance frequency and is higher than the resonance frequency of the torsional oscillations and, thereafter, to shift the frequency of the drive signal to the resonance frequency of the torsional oscillations.

2. An optical scanning device according to claim 1, wherein the optical scanning device further includes a first detection part which is configured to detect the resonance frequency of the torsional oscillations, and the drive signal outputting part is configured to adjust the specific frequency corresponding to the resonance frequency of the torsional oscillations, the first resonance frequency and the second resonance frequency.

3. An optical scanning device according to claim 1, wherein the drive signal outputting part is configured to output the drive signal with a first voltage until the oscillation frequency of the mirror portion passes the first resonance frequency lower than the resonance frequency of the torsional oscillations, and is configured to output the drive signal with a second voltage higher than the first voltage after the oscillation frequency of the mirror portion passes the first resonance frequency.

4. An optical scanning device according to claim 3, wherein the optical scanning device further includes a memory part which is configured to store preset period information as a period from a point of time that the drive signal outputting part outputs the drive signal to a point of time that the oscillation frequency of the mirror portion passes the first resonance frequency thereafter, and
the drive signal outputting part is configured to change a voltage of the drive signal from the first voltage to the second voltage based on the period information stored in the memory part.

5. An optical scanning device according to claim 3, wherein an optical scanning device further includes a second detection part which is configured to detect whether or not the oscillation frequency of the mirror portion passes the first resonance frequency, and
the drive signal outputting part is configured to change the voltage of the drive signal from the first voltage to the second voltage when the oscillation frequency of the mirror portion passes the first resonance frequency in the second detection part.

6. An optical scanning device according to claim 1, wherein the optical scanning element includes the mirror portion having the reflection surface which reflects light, a resilient beam which supports the mirror portion on one side thereof, a base body which supports the beam on another side of the beam, and a piezoelectric element which is mounted on at least a portion of the beam and is configured to oscillate or swing the mirror portion due to driving of the beam.

7. An image display device which is configured to display an image by scanning an optical flux modulated in response to an image signal on an image in two-dimensional directions by an optical scanning device, wherein
the optical scanning device comprises:
an optical scanning element which includes a mirror portion having a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being also configured to generate subsidiary resonance oscillations consisting of longitudinal oscillations or lateral oscillations at a first resonance frequency on a lower region side and at a second resonance frequency on a higher region side with respect to a resonance frequency of the resonance oscillations in the swinging state due to the torsional oscillations; and a drive signal outputting part which is configured to output a drive signal for oscillating the spring portion at a specific frequency which is a frequency between the first resonance frequency and the second resonance frequency and is higher than the resonance frequency of the torsional oscillations and, thereafter, to shift the frequency of the drive signal to the resonance frequency of the torsional oscillations.

8. A retinal scanning display which is configured to display an image by scanning an optical flux modulated in response to an image signal on an image in a primary direction and a secondary direction by an optical scanning device thus projecting the image on a retina of an eye provided with an optical scanning device, wherein the optical scanning device comprises:

an optical scanning element which includes a mirror portion having a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being also configured to generate subsidiary resonance oscillations consisting of longitudinal oscillations or lateral oscillations at a first resonance frequency on a lower region side and at a second resonance frequency on a higher region side with respect to a resonance frequency of the resonance oscillations in the swinging state due to the torsional oscillations; and a drive signal outputting part which is configured to output a drive signal for oscillating the spring portion at a specific frequency which is a frequency between the first resonance frequency and the second resonance frequency and is higher than the resonance frequency of the torsional oscillations and, thereafter, to shift the frequency of the drive signal to the resonance frequency of the torsional oscillations.

9. A driving method of an optical scanning element, the optical scanning element including a mirror portion which has a reflection surface and a spring portion which is connected to the mirror portion and is configured to generate torsional oscillations which generates resonance oscillations of the mirror portion in a swinging state, the optical scanning element being configured to scan light incident on the optical scanning element due to the resonance oscillations of the mirror portion on the reflection surface, and the optical scanning element being also configured to generate subsidiary resonance oscillations consisting of longitudinal oscillations or lateral oscillations at a first resonance frequency on a lower region side and at a second resonance frequency on a higher region side with respect to a resonance frequency of the resonance oscillations due to the torsional oscillations, the driving method comprising the steps of:

starting outputting of the drive signal by setting the frequency of a drive signal to a specific frequency which is a frequency between the first resonance frequency and the second resonance frequency and is higher than the resonance frequency of the torsional oscillations; and shifting the frequency of the outputted drive signal to the resonance frequency of the torsional oscillations after outputting of the drive signal starts.

* * * * *